United States Patent
Peterseim et al.

(10) Patent No.: US 6,892,870 B2
(45) Date of Patent: May 17, 2005

(54) FRICTION CLUTCH

(75) Inventors: Michael Peterseim, Bergrheinfeld (DE); Ingrid Hoffelner, Knetzgau (DE); Matthias Diemer, Niederwerrn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/443,558

(22) Filed: May 22, 2003

(65) Prior Publication Data
US 2003/0234149 A1 Dec. 25, 2003

(30) Foreign Application Priority Data
Jun. 19, 2002 (DE) .......................................... 102 27 328

(51) Int. Cl.$^7$ ............................................. F16D 13/70
(52) U.S. Cl. ............................. 192/107 R; 192/70.14; 192/70.27; 192/52.3
(58) Field of Search ........................... 192/107 R, 52.6, 192/107 C, 70.14, 70.27, 89.23, 107 M, 52.3; 188/73.37, 73.1

(56) References Cited

U.S. PATENT DOCUMENTS

| 5,154,683 | A | * | 10/1992 | Phelps ...................... 192/70.14 |
| 5,727,665 | A | * | 3/1998 | Gonia et al. ............. 192/70.14 |
| 6,409,002 | B1 | | 6/2002 | Orlamünder et al. |
| 6,732,846 | B2 | * | 5/2004 | Diemer et al. .......... 192/107 R |

* cited by examiner

Primary Examiner—Saul Rodriguez
(74) Attorney, Agent, or Firm—Cohen, Pontani, Lieberman & Pavane

(57) ABSTRACT

A friction clutch, particularly for a motor vehicle, has a rotatable clutch disk which is connected to a transmission input shaft so as to be fixed with respect to rotation relative to it and which can be clamped in axially between two clutch pressure plates. The pressure plates, which may be a clutch pressure plate and a flywheel, have annular friction surfaces which can act upon the clutch disk. The annular friction surfaces comprise the friction surfaces of a plurality of friction segments which are arranged in a uniformly distributed manner so as to form a ring, wherein every friction segment is arranged so as to be axially flexible in a springing manner to a certain extent.

28 Claims, 6 Drawing Sheets

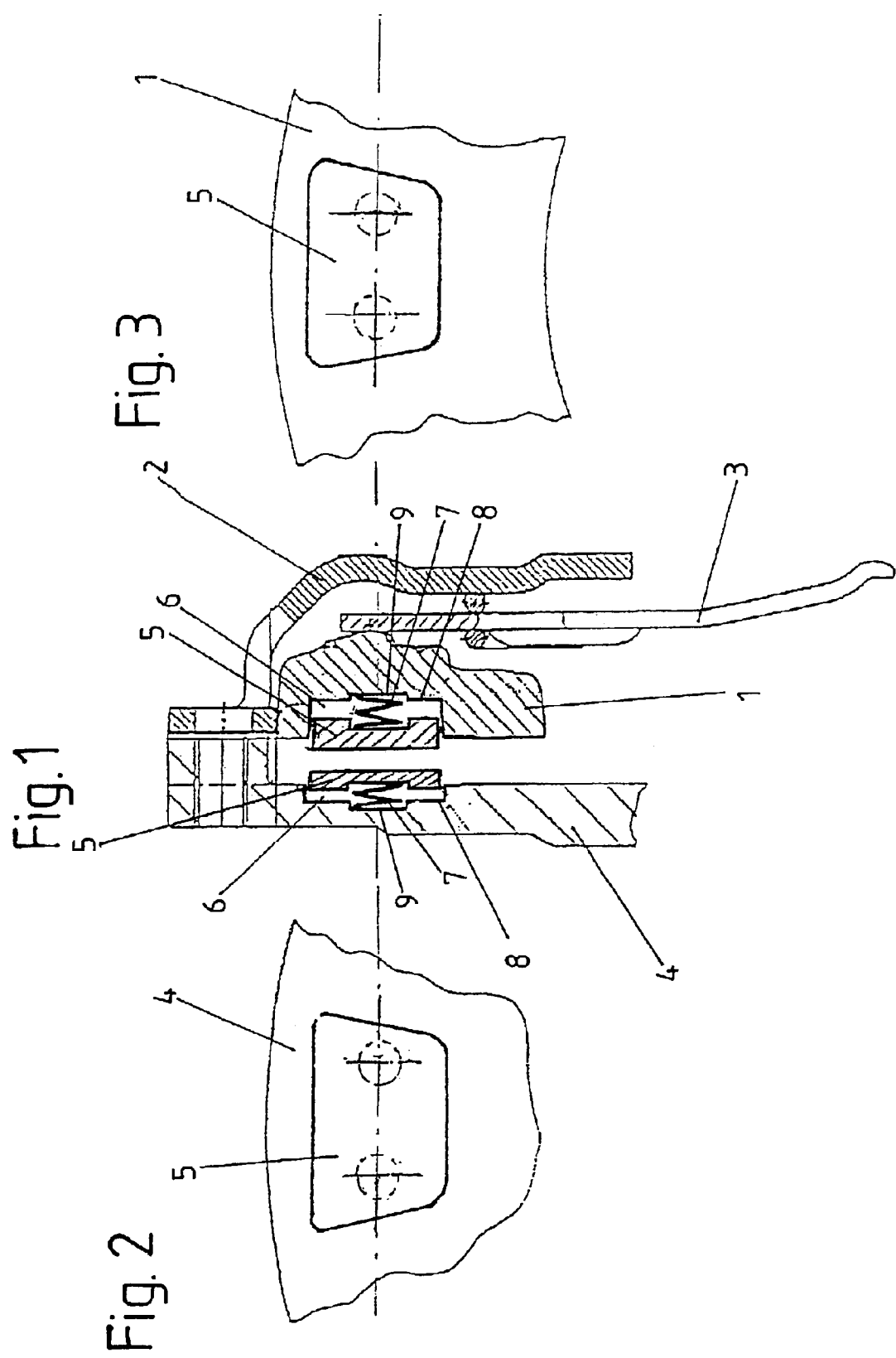

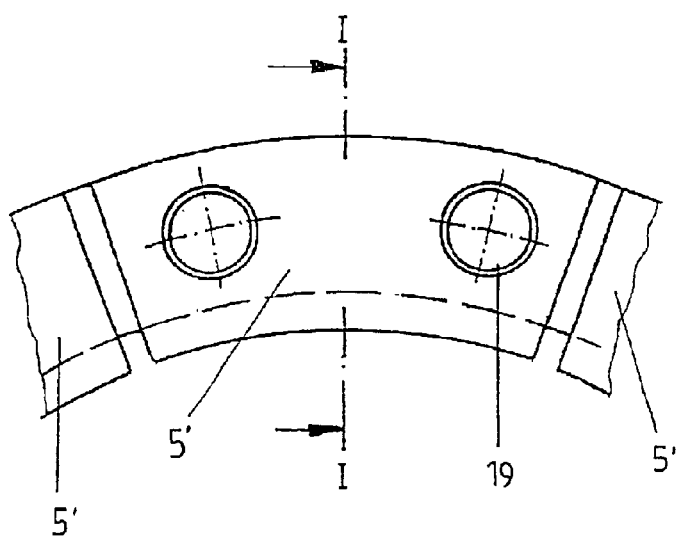
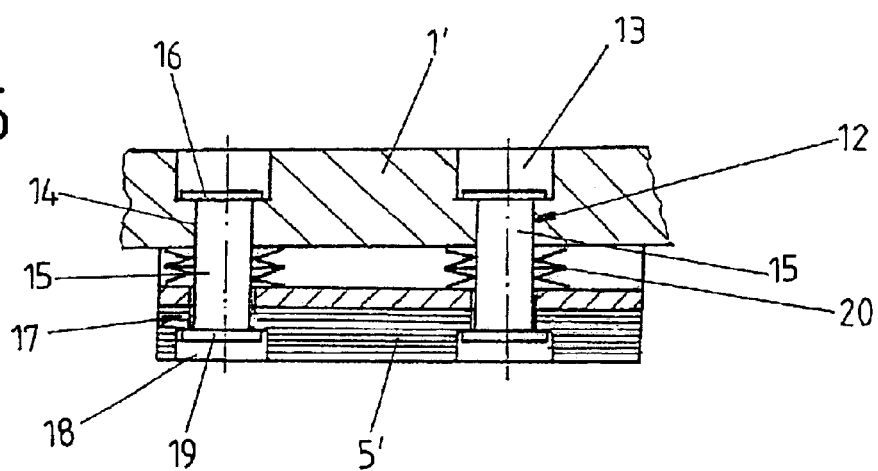
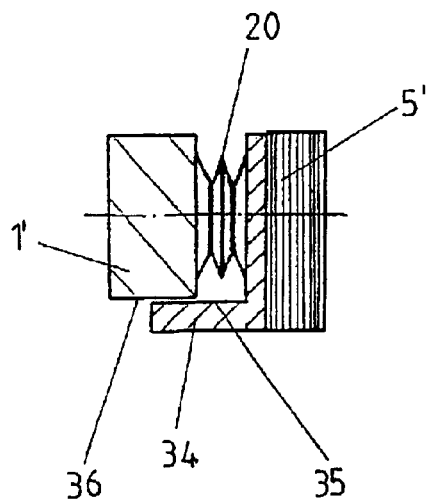

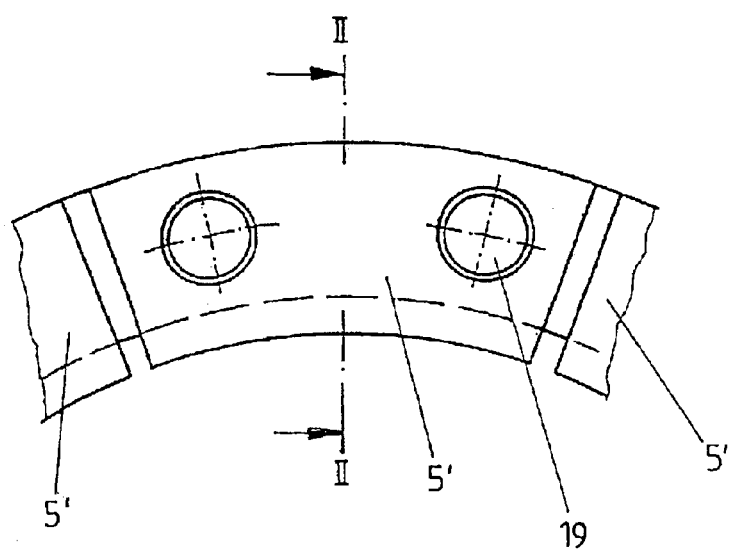
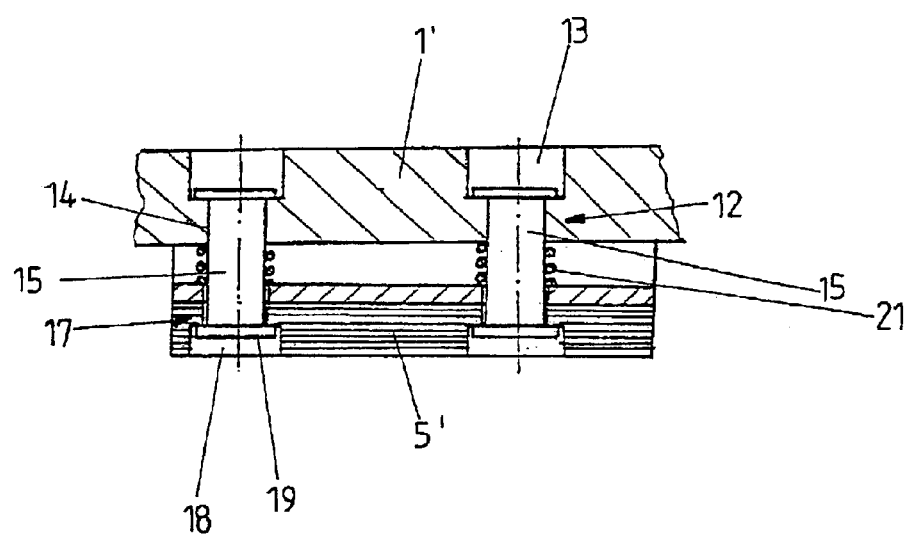
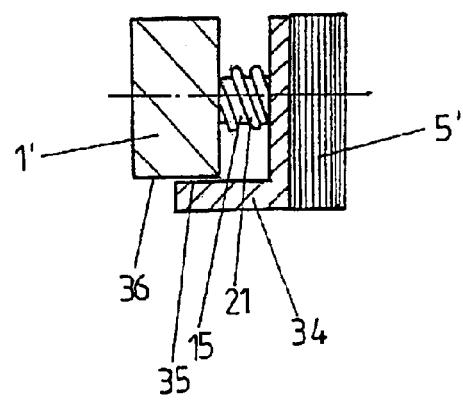

FRICTION CLUTCH

BACKGROUND OF THE INVENTION

1. Field of the Invention

The invention is directed to a friction clutch, particularly for a motor vehicle, with a rotatable clutch disk which is connected to a transmission input shaft so as to be fixed with respect to rotation relative to it and which can be clamped axially between two clutch pressure plates, which clutch pressure plates have annular friction surfaces that can act upon the clutch disk.

2. Description of the Related Art

In known friction clutches of the type mentioned above, the clutch pressure plates comprise a rigid annular body which exerts the pressing force on the clutch disk in the form of surface area pressing. The rigidity of the pressing plate does not allow it to adapt to local fluctuations in thickness of the friction lining of the clutch disk. Locally excited friction vibrations cover the entire clutch pressure plate which cannot offer any resistance to the buildup of vibrations due, among other things, to the lack of elasticity or damping.

SUMMARY OF THE INVENTION

It is an object of the invention to provide a friction clutch in which an excitation of vibrations of the clutch pressure plates is to a large extent prevented in a simple manner.

According to the invention, at least one of the annular friction surfaces includes the friction surfaces of a plurality of friction segments or groups of friction segments which are arranged in a uniformly distributed manner so as to form a ring, wherein every friction segment or every friction segment group is arranged so as to be axially flexible in a springing manner to a certain extent.

By dividing the clutch pressure plate into friction segments or friction segment groups, the surface area pressing can be kept extensively constant regardless of variations in the thickness of the friction lining of the clutch disk. Further, by dividing the clutch pressure plate into separate friction segments or friction segment groups, they can vibrate individually. This vibration is reduced by local friction more quickly than in a rigid annular body according to known clutch pressure plates.

The axial springing of the individual friction segments or friction segment groups impedes the buildup of self-excited frictional vibrations and accordingly makes it possible to use friction linings of the clutch disk with higher friction coefficients, for example, due to optimized lining materials.

Another result of dividing into friction segments or friction segment groups is that their friction surfaces also respond in an extensively parallel manner when heated. A thermal expansion that is not parallel, such as occurs in clutch pressure plates constructed as rigid annular bodies, is not possible.

The construction according to the invention is advantageously also applicable in a two-disk clutch such as is known, e.g., from U.S. Pat. No. 6,409,002, or in a dual clutch in which a clutch disk can transmit engine torque to its own transmission shaft independent from the second clutch disk.

The friction segments or friction segment groups can be arranged at a counter-clutch pressure plate forming one of the clutch pressure plates, particularly a flywheel that can be driven in rotation by a crankshaft of an internal combustion engine.

Further, the friction segments or friction segment groups can be arranged at a clutch pressure plate and/or counter-clutch pressure plate which can be acted upon by a spring, particularly a diaphragm spring, so as to be movable against the clutch disk.

A good lifting of the friction segments or friction segment groups from the clutch disk results when the friction segments or friction segment groups are acted upon in a springing manner by the clutch disk in a disengagement position in which their friction surfaces are inclined in circumferential direction of the clutch disk by a determined angle relative to the application plane of the clutch disk.

In this regard, it is advantageous if the run-out end of the friction segments or friction segment groups is closer to the application plane of the clutch disk in the disengagement position and the run-in end is farther away from the application plane in the disengagement position. Due to the elastically springing application of the friction segments or friction segment groups, there is no sudden gripping of the totality of friction surfaces when the clutch is closed, rather there is a gradual enlargement of the effective friction surface due to the reduction of the angle of the friction surfaces relative to the application plane of the clutch disk. The edges of the friction segments or friction segment groups are preferably provided with a bevel or are rounded off.

Excitation of vibrations is prevented particularly effectively when the friction surfaces of the friction segments or friction segment groups are inclined at different angles relative to the application plane of the clutch disk.

Also, a good reduction in the sensitivity to frictional vibrations results when the friction segments or friction segment groups are acted upon by spring elements with spring rigidity which differs in circumferential direction.

This can be achieved in a simple manner if a friction segment or a friction segment group is acted upon by spring elements arranged at a distance from one another in circumferential direction.

For the axial movability of the friction segments or friction segment groups, the latter can be guided at a clutch pressure plate and/or counter-clutch pressure plate so as to be axially movable.

The friction segments or friction segment groups can be guided so as to be movable axially but so as to be well supported at the clutch pressure plate and/or counter-clutch pressure plate in circumferential direction by providing the clutch pressure plate and/or counter-clutch pressure plate with barrel-shaped recesses which open toward the clutch disk and in which the friction segments or the friction segment groups are guided so as to be displaceable.

In this connection, for axially elastic application, the friction segments or friction segment groups can be acted upon in the direction of the clutch disk by pressure springs, particularly coil springs, supported at the base of the barrel-shaped recesses.

To prevent disengagement of the friction segments or friction segment groups from the clutch pressure plate, the friction segments or friction segment groups can have radially outwardly directed stops at their end region projecting into the barrel-shaped recess, and the clutch pressure plate and/or counter-clutch pressure plate have/has counter-stops at the opening or mouth area of the barrel-shaped recess, which counter-stops are directed radially inward and limit the displaceability of the friction segments or friction segment groups relative to the clutch disk.

Counter-stops of the type mentioned above can be formed in a particularly simple manner by a radially inwardly directed deformation, particularly an upsetting of the mouth rim of the barrel-shaped recess.

Further advantageous guiding for axial movability of the friction segments or friction segment groups is provided by one or more guide pins which project from the clutch pressure plate and/or the counter-clutch pressure plate have/has one or more guide pins which project toward the clutch disk and on which the friction segment or friction segment group is arranged so as to be guided displaceably with corresponding axial recesses.

One or more pretensioned pressure springs can be arranged between the clutch pressure plate and/or counter-clutch pressure plate and friction segment or friction segment group for axially elastic application.

When the pressure springs are springs which enclose the guide pins, particularly coil springs or disk springs, no special fasteners are required for these springs. The springs can also be formed as disk spring assemblies or coil spring assemblies.

In order to prevent the friction segments or friction segment groups from disengaging from the clutch pressure plate and/or counter-clutch pressure plate, the guide pins can widen radially at their end directed toward the clutch disk, this radial widening being greater than the cross section of the recess of the friction segment or of the friction segment group, wherein the radial widening is arranged in a correspondingly widened recess of the friction segment. The friction segment or friction segment group is additionally secured in position in that the friction segment or the friction segment group has a guide surface which extends axially into the area of the clutch pressure plate and/or counter-clutch pressure plate and which contacts a corresponding counter-guide surface of the clutch pressure plate and/or counter-clutch pressure plate at the radial inside and/or radial outside so as to be axially displaceable. When the guide surface is arranged on the radial inside, the centrifugal forces acting on the friction segment or friction segment group can be supported in a simple manner at the clutch pressure plate.

When the friction segments or friction segment groups are fastened to the clutch pressure plate and/or counter-clutch pressure plate by means of axially springing spring elements which are rigid in circumferential direction, these spring elements fulfill a dual function in that they act upon the friction segments or friction segment groups in a springing manner and also serve to hold and support in circumferential direction.

In a simple construction, the spring elements have spring arms that are fastened by one end to the clutch pressure plate and/or counter-clutch pressure plate, have the friction segment or friction segment group at their spring arms which are at a distance from the clutch pressure plate and/or counter-clutch pressure plate, and can be deflected toward the clutch pressure plate and/or counter-clutch pressure plate by their spring arms by overcoming their spring force.

For the purpose of defining the position when the clutch is released, the free ends of the spring arms can be supported at the clutch pressure plate and/or counter-clutch pressure plate.

The number of structural component parts is reduced and assembly is simplified when the spring element has a common fastening area and a plurality of spring arms which are arranged at a distance from one another and which project away from the latter radially in circumferential direction.

The spring arms of the spring element can have different spring constants for a particularly effective reduction in sensitivity to friction vibrations.

A construction which is especially easy to assemble and has a low number of structural component parts is achieved in that the friction segments or friction segment groups are fastened to an annular spring element which forms the clutch pressure plate and which is constructed so as to be somewhat wavy radially along the circumference, wherein the fastening areas of the friction elements or friction segment groups of the annular spring element extend so as to be inclined at the determined angle relative to the application plane of the clutch disk.

In this construction, the clutch pressure plate and spring element are formed by a single structural component part.

In order to close the clutch, either the annular spring element can be acted upon by a spring, particularly a diaphragm spring, against the clutch disk or the annular spring element can have apertures in the areas of the friction segments or friction segment groups, and application projections of the spring elements or spring element groups which can be acted upon by a spring, particularly a diaphragm spring, against the clutch disk can project axially through these apertures.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 shows a cross section through a first embodiment example of a friction clutch in a sectional side view.

FIG. 2 is a plan view of the area of a friction segment of a flywheel according to FIG. 1.

FIG. 3 is a plan view of the area of a friction segment of an axially movable clutch pressure plate according to FIG. 1.

FIG. 5 shows a cross section through a third embodiment example of a friction clutch in a sectional top view.

FIG. 6 is a plan view of the friction clutch according to FIG. 5.

FIG. 7 shows a sectional view along line I—I in FIG. 6.

FIG. 8 shows a cross section through a fourth embodiment example of a friction clutch in a sectional top view.

FIG. 9 is a plan a view of the friction clutch according to FIG. 8.

FIG. 10 is a sectional view along line II—II in FIG. 9.

DETAILED DESCRIPTION OF THE PRESENTLY PREFERRED EMBODIMENTS

Figure 4:
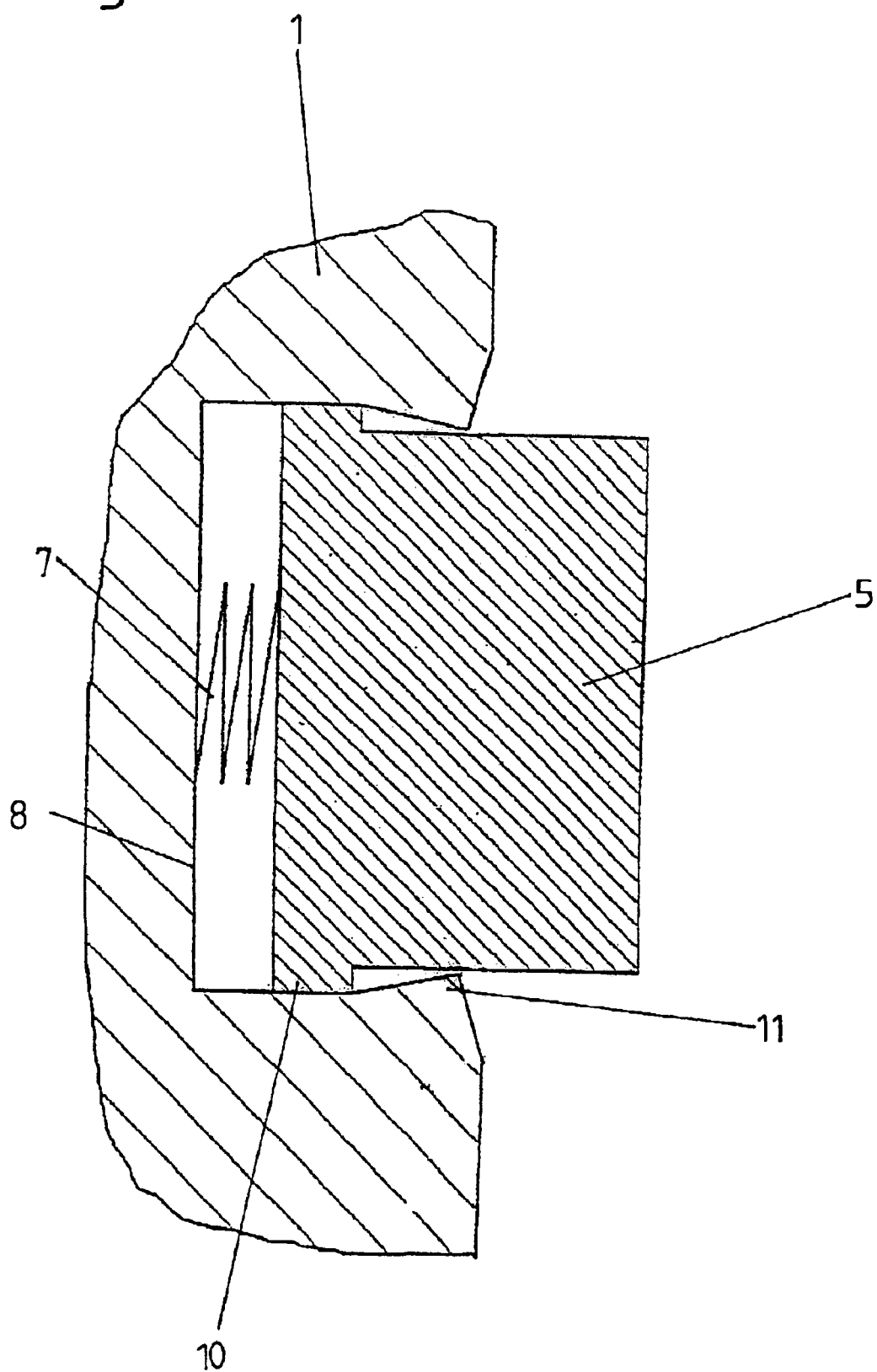
FIG. 4 shows a cross section through a second embodiment example of a friction clutch in a sectional side view.

The friction clutches shown in the drawings have an axially movable clutch pressure plate 1, 1', 1", 1'''. The clutch pressure plate 1, 1', 1", 1''' is acted upon by a diaphragm spring 3 supported at a clutch housing 2 so as to be tiltable and is movable axially against a flywheel 4 which is immovable axially, fixedly connected to the clutch housing 2 and can be driven in rotation by a crankshaft, not shown, of an internal combustion engine. The clutch pressure plate 1, 1', 1", 1''' and the flywheel 4 have friction surfaces axially across from one another on their sides facing one another. A clutch disk 33 can be clamped axially between the friction surfaces and can accordingly be connected in a frictional engagement and is connected to a transmission input shaft of a transmission, not shown, so as to be fixed with respect to rotation relative to it.

With the exception of the embodiment example in FIGS. 1 to 3, the friction surface of the flywheel 4 is a friction surface which is formed stationary at the flywheel 4.

The friction surfaces of the axially movable clutch pressure plates 1, 1', 1", 1''' and the friction surface of the flywheel 4 of the embodiment example of FIGS. 1 to 3 comprise the friction surfaces of a plurality of friction segments 5, 5', 5", 5''' which are uniformly distributed so as to form a ring and which are supported by the clutch pressure plate 1, 1', 1", 1''' and by the flywheel 4 in FIGS. 1 to 3.

In the embodiment examples shown in FIGS. 1 to 4, barrel-shaped recesses 6 whose cross sections correspond to the cross sections of the friction segments 5 and which are open toward the clutch disk 33 are formed in the clutch pressure plate 1 and in the flywheel 4. The friction segments 5 are inserted into the barrel-shaped recesses 6 so as to be guided in an axially displaceable manner and are acted upon by coil springs 7 which are supported at the bases 8 of the barrel-shaped recesses 6 and which act upon the sides of the friction segments 5 facing the bases 8.

Depressions 9 that can receive the coil springs 7 which are compressed en bloc are formed at the bases 8 as well as at the friction segments 5 in the contact area of the coil springs 7 so that the friction segments 5 which are displaced entirely into the barrel-shaped recesses 6 when the friction clutch is closed.

In FIGS. 1 to 3, two coil springs 7 which differ in spring rigidity are arranged at a distance from one another in circumferential direction.

A circumferential, radially projecting stop 10 whose circumferential contour has a cross section corresponding to the cross section of the barrel-shaped recess 6 is formed at the end of the friction segment 5 projecting into the barrel-shaped recess 6 so that the friction segment 5 in FIG. 4 cannot fall out of its barrel-shaped recess 6. After the friction segment 5 is inserted into the barrel-shaped recess 6, its mouth rim 11 was deformed on the radial inside by upsetting and forms a counter-stop for the stop 10, so that the friction segment 5 can be displaced outward until the stop 10 contacts the deformed mouth rim 11.

In the embodiment examples of FIGS. 5 to 10, two axially continuous stepped bore holes 12 whose large step 13 opens toward the side remote of the clutch disk 33 are formed at a distance from one another in circumferential direction at the clutch pressure plate 1'. Guide pins 15 are guided so as to be axially displaceable in the small steps 14 of the stepped bore holes 12, their ends projecting into the large step 13 having a circumferentially radially projecting stop 16. The other ends of the guide pins 15 project into axial stepped bore holes 17 of the friction segment 5' whose large steps 18 face the clutch disk 33 and receive circumferentially radially projecting stops 19 of the guide pins 15.

In the disengaging position of the friction clutch, the friction segment 5' is held at a distance from the clutch pressure plate 1' by pressure springs. As a result of the different length of the two guide pins 15, the friction segment 5' is inclined with its friction surface in circumferential direction at a determined angle relative to the application plane of the clutch disk. The run-out end of the friction segment 5' is closer to the clutch disk than the run-in end.

At the radial inner area, the friction segment 5' has a projection 34 which projects axially into the area of the clutch pressure plate 1' with a radially outwardly directed guide surface 35 which contacts a radially inwardly directed counter-guide surface 36 of the clutch pressure plate 1' in an axially displaceable manner.

In the embodiment example of FIGS. 5 to 7, the pressure springs are assemblies or sets of disk springs 20 enclosing the guide pins 15, while the pressure springs in the embodiment example of FIGS. 8 to 10 are coil springs 21 enclosing the guide pins 15.

Figure 12:
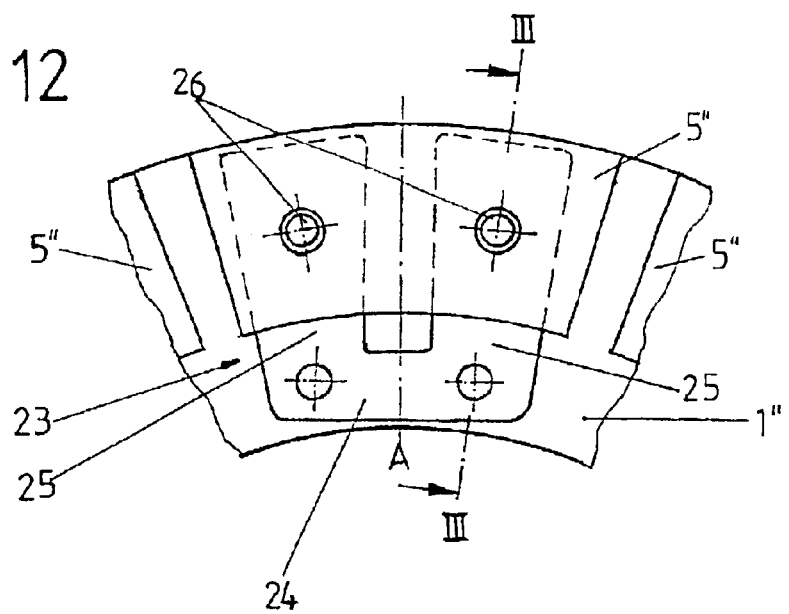
FIG. 12 is a plan view of the friction clutch according to FIG. 11.
Figure 11:
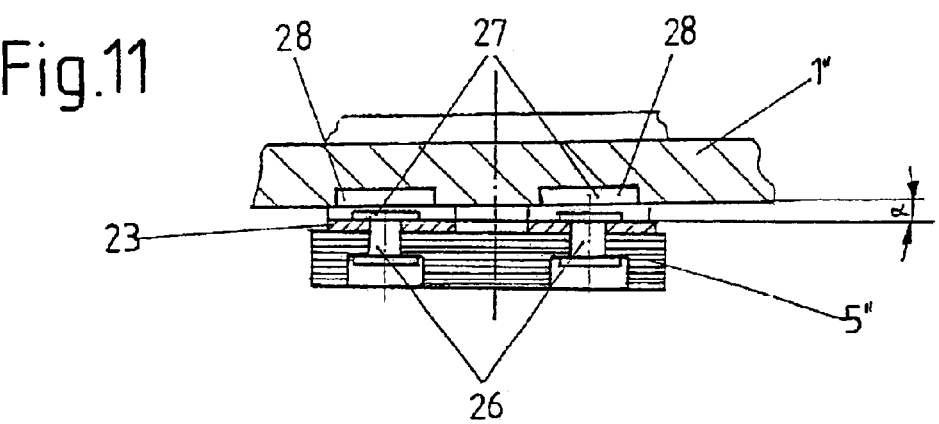
FIG. 11 shows a cross section through a fifth embodiment example of a friction clutch in a sectional top view.
Figure 13:
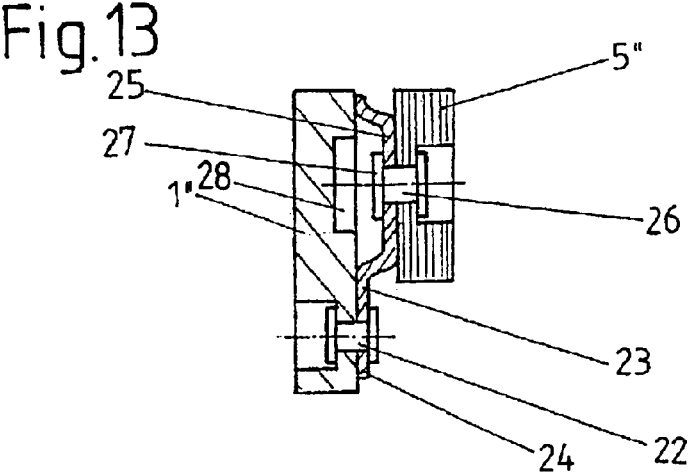
FIG. 13 shows a sectional view along line III—III in FIG. 12.

In the embodiment example of FIGS. 11 to 13, a spring element 23 which comprises a spring plate and has a fastening area 24 is fastened to the clutch pressure plate 1" by means of rivets 22. Two spring arms 25 of the spring element 23 which are arranged at a distance from one another in circumferential direction project slightly radially outward from the fastening area 24.

A friction segment 5" is fastened to the spring arms 25 by means of rivet connections 26 which are at a distance from the friction clutch of the clutch pressure plate 1" in the released position. The two spring arms 25 of a spring element 23 carry a friction segment 5". The free ends of the spring arms 25 are coplanar and are bent toward the clutch pressure plate 1" at an acute angle α. The rivet heads 27 of the rivet connections 26 that are directed toward the clutch pressure plate 1" can penetrate into depressions 28 of the clutch pressure plate 1" when the friction segment 5" moves axially toward the clutch pressure plate 1".

Figure 15:
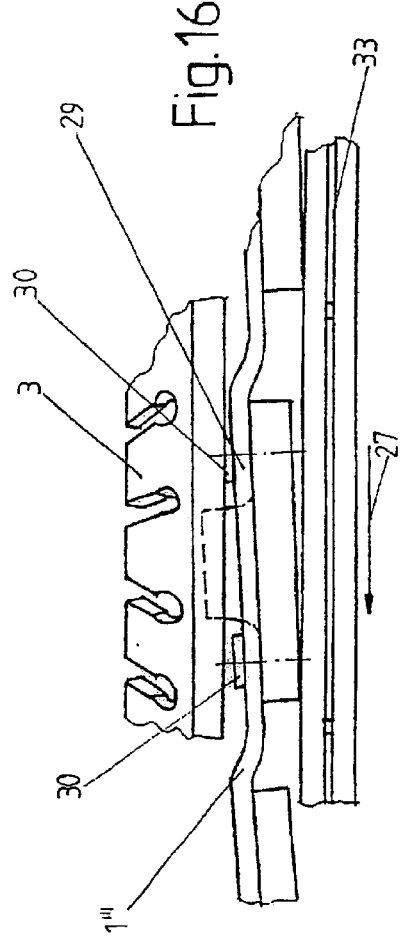
FIG. 15 is a plan view of the area of a friction segment of a clutch pressure plate according to FIG. 14.
Figure 16:
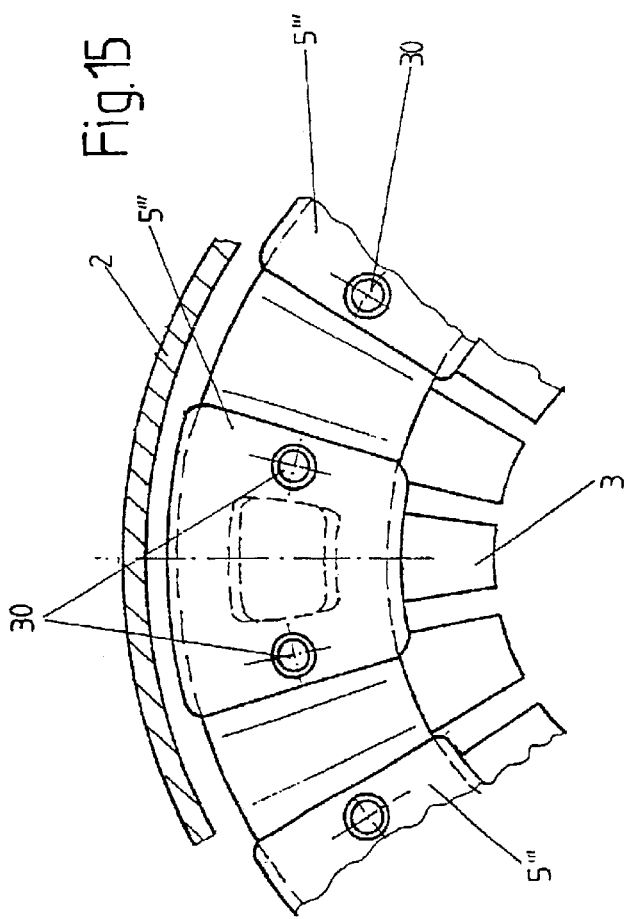
FIG. 16 is a side view of the friction clutch according to FIG. 14, in section.
Figure 14:
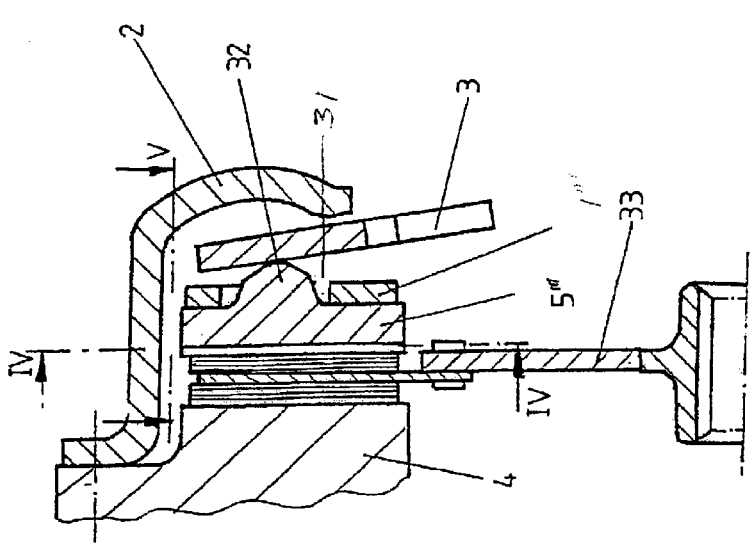
FIG. 14 shows a cross section through a sixth embodiment example of a friction clutch in a sectional side view.

In the embodiment example shown in FIGS. 14 to 16, the clutch pressure plate 1''' comprises an annular spring element which is constructed in a slightly wavy manner and has fastening areas 29 to which friction segments 5''' are fastened by rivets 30. When the friction clutch is open, the fastening areas 29 extend so as to be inclined at a determined angle relative to the application plane of the clutch disk 33. In this position, the run-out end of the friction segments 5''' is closer to the application plane of the clutch disk 33 and the run-in end is farther away from the application plane of the clutch disk 33.

Apertures 31 are formed in the fastening areas 29. Application projections 32 which can be acted upon by the diaphragm spring 3 against the clutch disk 33 for closing the friction clutch project through these apertures 31. When the friction clutch is closed and the clutch pressure plate 1" acts against the clutch disk 33, the annular clutch pressure plate 1''' extends in circumferential direction so as to form a ring which is at least substantially free from waviness, and the friction segments 5''' come into flat contact with the clutch disk 33 by their friction surfaces. The clutch pressure plate 1''' is connected to the clutch housing 2 by tangential leaf springs, not shown.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A friction clutch for a motor vehicle, said friction clutch comprising:
   a clutch disk which can be connected to a transmission input shaft so as to be fixed against rotation relative to said input shaft, said clutch disk having an application plane; and
   a pair of pressure plates having mutually facing annular friction surfaces which act on the clutch disk, at least one of said friction surfaces being formed by a plurality of friction segments which are uniformly distributed to form a ring, each said segment being spring-loaded axially by a predetermined amount toward said clutch disk; said friction segments having friction surfaces which are circumferentially inclined at a predetermined acute angle relative to the application plane when the clutch disk is disengaged from the pressure plates.

2. A friction clutch as in claim 1 wherein one of said pressure plates is a flywheel, said friction segments being arranged on said flywheel.

3. A friction clutch as in claim 1 wherein one of said pressure plates is a clutch pressure plate which is acted on by a diaphragm spring so as to be movable against the clutch disk, said friction segments being arranged on said clutch pressure plate.

4. A friction clutch as in claim 1 wherein each of said segments has a run-out end and a run-in end, said run-out end being closer to the application plane than the run-in end when the clutch disk is disengaged.

5. A friction clutch as in claim 1 wherein said friction surfaces at least some of said friction segments are inclined at different angles to said application plane of said clutch disk.

6. A friction clutch as in claim 1 further comprising spring elements which act axially on said segments, at least some of said spring elements having different spring constants.

7. A friction clutch as in claim 6 wherein each said friction segment is acted on by spring elements which are circumferentially spaced.

8. A friction clutch as in claim 1 wherein said friction segments are arranged on at least one of a clutch pressure plate and a flywheel so as to be axially movable relative thereto.

9. A friction clutch as in claim 8 wherein said at least one of said clutch pressure plate and said flywheel has barrel shaped recesses which open toward the clutch disk, said friction segments being axially displacable in said recesses.

10. A friction clutch as in claim 9 further comprising compression springs supported in said recesses and acting on said friction segments.

11. A friction clutch as in claim 9 wherein each said friction segment has radially outward directed stops, each said recess having a mouth formed with radially inward directed counter-stops which cooperate with the stops to limit the displaceability of the friction segment relative to the clutch disk.

12. A friction clutch as in claim 11 wherein said counter-stops are formed deforming the mouths of the recesses.

13. A friction clutch as in claim 8 wherein said at least one of said clutch pressure plate and said flywheel further comprises guide pins which project toward the clutch disk said friction segments being axially guided on said guide pins.

14. A friction clutch as in claim 13 further comprising pre-tensioned pressure springs arranged between said friction segments and said at least one of said clutch pressure plate and said flywheel.

15. A friction clutch as in claim 14 wherein said pressure springs comprise one of coil springs and disk springs received concentrically on said guide pins.

16. A friction clutch as in claim 13 wherein said friction segments have bores which receive said guide pins and countersunk recesses surrounding said bores, said guide pins having heads which are received in said countersunk recesses to retain said friction segments.

17. A friction clutch as in claim 8 wherein each said friction segment has a guide surface which extend axially into said at least one of said clutch pressure plate and said flywheel, said at least one of said clutch pressure plate and said flywheel having a counter-guide surface which is contacted by said guide surface so that said friction segments are axially displaceable.

18. A friction clutch as in claim 1 wherein said friction segments are arranged on a clutch pressure plate, said clutch pressure plate comprising an annular spring element having fastening areas which are inclined at a predetermined acute angle relative to the application plane when the clutch disk is disengaged from the pressure plates, said friction segments being fastened to respective said fastening areas.

19. A friction clutch as in claim 18 further comprising a diaphragm spring which can act on said annular spring element.

20. A friction clutch as in claim 19 wherein each said fastening area has an aperture and each said friction segment has an application projection which extends axially through a respective said aperture so that said application projection can be acted on by said diaphragm spring.

21. A friction clutch for a motor vehicle, said friction clutch comprising:
   a clutch disk which can be connected to a transmission input shaft so as to be fixed against rotation relative to said input shaft;
   a pair of pressure elates having mutually facing annular friction surfaces which act on the clutch disk, at least one of said friction surfaces being formed by a plurality of friction segments which are uniformly distributed to form a ring, each said segment being string-loaded axially by a predetermined amount toward said clutch disk; and
   axially loaded spring elements which are circumferentially rigid and load said friction segments away from said at least one of said pressure plates, wherein each said spring element comprises a plurality circumferentially spaced spring arms and a common fastening area, said spring arms extending radially away from said fastening area, said friction segments being deflectable toward said at least one of said pressure plates by overcoming the spring force of the spring arms.

22. A friction clutch as in claim 21 wherein said spring arms have free ends which can be supported against said at least one of said pressure plates.

23. A friction clutch as in claim 21 wherein the spring arms of each said spring element have different spring constants.

24. A friction clutch for a motor vehicle, said friction clutch comprising:
- a clutch disk which can be connected to a transmission input shaft so as to be fixed against rotation relative to said input shaft; and
- a clutch pressure plate and a flywheel having mutually facing annular friction surfaces which act on the clutch disk, at least one of said friction surfaces being formed by a plurality of friction segments which are uniformly distributed to form a ring, each said segment being spring-loaded axially by a predetermined amount toward said clutch disk, wherein said at least one of said clutch pressure plate and said flywheel further comprises guide pins which project toward the clutch disk, said friction segments being axially guided on said guide pins so as to be axially movable relative to said one of said clutch pressure plate and said flywheel.

25. A friction clutch as in claim 24 further comprising pre-tensioned pressure springs arranged between said friction segments and said at least one of said clutch pressure plate and said flywheel.

26. A friction clutch as in claim 25 wherein said pressure springs comprise one of coil springs and disk springs received concentrically on said guide pins.

27. A friction clutch as in claim 24 wherein said friction segments have bores which receive said guide pins and countersunk recesses surrounding said bores, said guide pins having heads which are received in said countersunk recesses to retain said friction segments.

28. A friction clutch as in claim 24 wherein each said friction segment has a guide surface which extend axially into said at least one of said clutch pressure plate and said flywheel, said at least one of said clutch pressure plate and said flywheel having a counter-guide surface which is contacted by said guide surface so that said friction segments are axially displaceable.

* * * * *